June 1, 1926.

L. P. GIGNAC

DITCH LIGHT

Filed July 27, 1925

Inventor
Leonidas P. Gignac
By William Linton
Attorney

Patented June 1, 1926.

1,587,375

UNITED STATES PATENT OFFICE.

LEONIDAS P. GIGNAC, OF ROCK ISLAND, QUEBEC, CANADA.

DITCH LIGHT.

Application filed July 27, 1925. Serial No. 46,405.

The present invention pertains to a novel ditch light adapted for application to a motor vehicle for the purpose of illuminating the ditch or edge of the road.

In the present practice of automobile driving, it is customary or compulsory to dim the head lights when another vehicle is approaching. During the time that the lights are dimmed, there is insufficient illumination of the ditch or edge of the road, as a consequence of which the vehicle may run off the road. The object of the present invention is to overcome this danger by the use of the light constituting the subject matter of the invention. The light is applied to the forward end of the vehicle, preferably at the right hand side thereof. It is directed towards the edge of the road and is brought into operation to illuminate this region when the head lights are dimmed in the manner described above.

The invention is fully disclosed in the following description and in the accompanying drawings in which.

Reference to these views will now be made by use of like characters which are employed to designate corresponding parts throughout.

Figure 1:
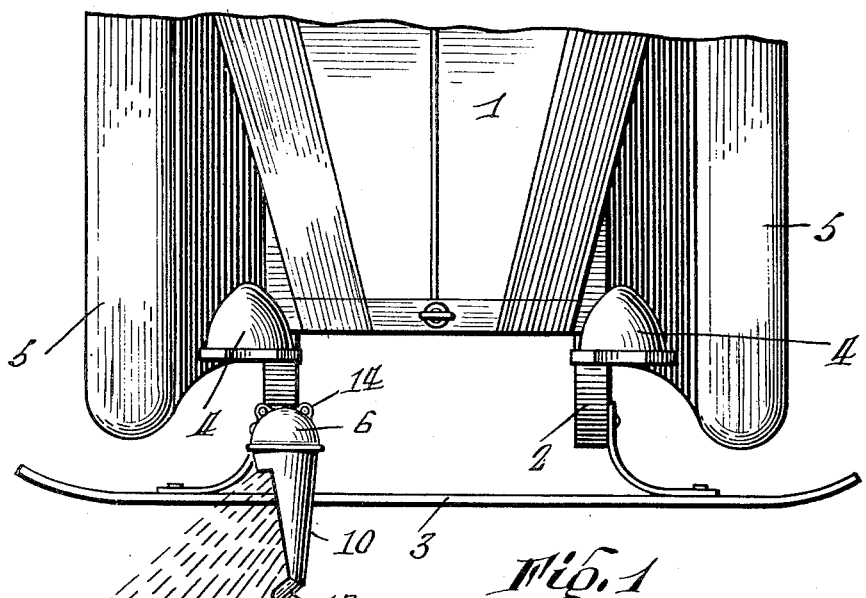
Figure 1 is a plan view of the front end of an automobile having the device of the invention applied thereto.

In Figure 1 is shown the hood 1 of an automobile mounted on the usual front springs 2 to which the bumper 3 is attached. At the front end of the hood are provided a pair of head lights 4 in the regular manner.

The device of the invention consists of an auxiliary ditch light secured to the front end of the vehicle on any of the parts mentioned or on one of the mudguards 5. Preferably, the light is supported at the right hand side of the vehicle.

Figure 3:
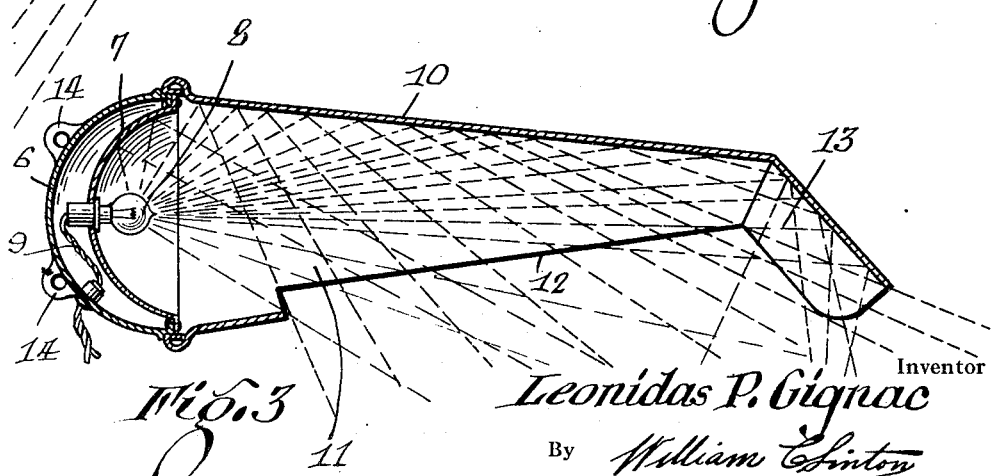
Figure 3 is an enlarged longitudinal section on the line 3—3 of Figure 2.

The light comprises a semi-spherical housing 6 in which is secured a similarly shaped lamp reflector 7. A lamp 8 is secured within the reflector at the centre thereof and receives its current from a conductor 9 disposed in the space between the members 6 and 7 and passing through the former as illustrated in Figure 3.

Figure 2:
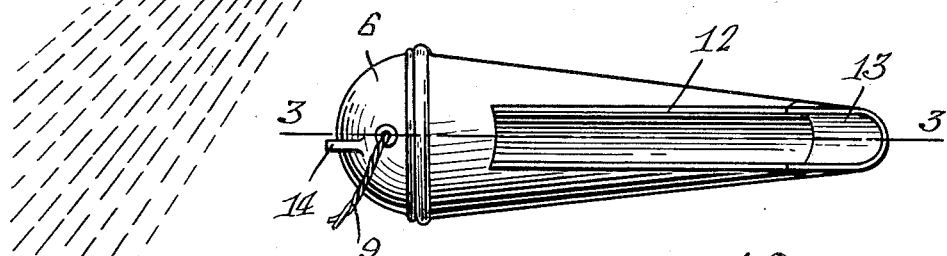
Figure 2 is a side elevation of the device.

To the edge of the housing 6 is secured, in any suitable manner a hood 10, the inner surface 11 of which is made reflective by the application of a suitable substance or by polishing the material constituting the hood. This member is of conical or tapered configuration and has a longitudinal slot 12 cut in its wall as may be seen in the several figures. The forward end of the hood is formed with a lip 13 disposed at an angle to the wall of the hood and bent along the forward edge of the slot 12 as illustrated in Figures 1 and 2. The inner surface of the lip is also adapted to reflect light as shown by the broken lines in Figure 3.

The housing 6 is preferably formed with a pair of external ears for attachment to a fixed part of the vehicle. The attachment may be made by passing U-bolt over one of the forward springs 2 and securing the ends of the bolt in the ears 14. It will be understood however, that the auxiliary light may be fixed to any other stationary part of the vehicle, such as the bumper or mudguards, and at any point along the front end of the vehicle.

The lamp is made of such dimensions, particularly with reference to the slot 12 and lip 13, that a light is shed for 20 to 25 feet in advance of the vehicle and the same distance at the side of the road. In the running of the vehicle, the head lights 4 are dimmed in the ordinary manner when another vehicle is approaching. The dimmed lights however are not sufficient to show the edge of the road and ditch, and the use of the auxiliary ditch lamp at this time renders the vehicle less likely to run off the road. It is also to be observed that the slot 12 is necessarily directed to the edge of the road. This condition, and also the presence of the lip 13 at the forward end of the light, prevent the auxiliary lamp from glaring into the eyes of the approaching driver.

While a specific embodiment of the invention has been illustrated and described, it is to be understood that various alterations in the details of construction may be made without departing from the spirit of the invention as indicated by the appended claim.

Having thus fully described the invention, what I claim as new and desire to protect by Letters Patent is:

A ditch light comprising a housing, a lamp disposed therein, a conical reflecting hood secured to said housing and extending forwardly with respect to the lamp, said hood having a longitudinal slot in its wall, and a relatively short lip secured to the forward end of said hood, said lip being disposed at an obtuse angle to the wall of the hood.

In witness whereof I have hereunto set my hand.

LEONIDAS P. GIGNAC.